US011074227B2

(12) United States Patent
Chen et al.

(10) Patent No.: US 11,074,227 B2
(45) Date of Patent: Jul. 27, 2021

(54) ID MANAGEMENT FOR A NETWORK ATTACHED STORAGE SYSTEM

(71) Applicant: INTERNATIONAL BUSINESS MACHINES CORPORATION, Armonk, NY (US)

(72) Inventors: Lior Chen, Jerusalem (IL); Dan Cohen, Nataf (IL); Daniel Gan-Levi, Modiin (IL); Shai M. Koffman, Hod Hasharon (IL); Nimrod Sapir, Rehovot (IL)

(73) Assignee: International Business Machines Corporation, Armonk, NY (US)

(*) Notice: Subject to any disclaimer, the term of this patent is extended or adjusted under 35 U.S.C. 154(b) by 1078 days.

(21) Appl. No.: 14/320,785

(22) Filed: Jul. 1, 2014

(65) Prior Publication Data

US 2016/0004693 A1   Jan. 7, 2016

(51) Int. Cl.
*G06F 3/06* (2006.01)
*G06F 16/182* (2019.01)
*H04L 29/08* (2006.01)
*G06F 16/16* (2019.01)

(52) U.S. Cl.
CPC ........ *G06F 16/1827* (2019.01); *G06F 3/0605* (2013.01); *G06F 3/067* (2013.01); *G06F 3/0631* (2013.01); *G06F 16/166* (2019.01); *H04L 67/1097* (2013.01)

(58) Field of Classification Search
CPC .... G06F 17/30123; G06F 17/302; G06F 3/06; G06F 17/06; G06F 17/30; H04L 67/1097
USPC ................................................. 707/609, 825
See application file for complete search history.

(56) References Cited

U.S. PATENT DOCUMENTS

| 6,457,130 | B2 | 9/2002 | Hitz et al. |
| 7,421,555 | B2 | 9/2008 | Dorey |
| 7,761,552 | B2 | 7/2010 | Nakamura et al. |
| 7,844,582 | B1 | 11/2010 | Arbilla et al. |
| 8,370,910 | B2 | 2/2013 | Kamei et al. |
| 8,700,575 | B1* | 4/2014 | Srinivasan .......... G06F 11/2064 707/655 |
| 2005/0044399 | A1* | 2/2005 | Dorey ................. G06F 21/6236 726/26 |
| 2005/0223014 | A1* | 10/2005 | Sharma ............. G06F 17/30197 707/999.01 |
| 2007/0055703 | A1* | 3/2007 | Zimran ................. H04L 61/301 |
| 2007/0100980 | A1* | 5/2007 | Kataoka ................. H04L 12/24 709/223 |

(Continued)

OTHER PUBLICATIONS

Watson et al., "Multiprotocol Data Access: NFS, CIFS, and HTTP," Technical Report, TR3014, Network Appliance, Inc., 2005.

*Primary Examiner* — Hosain T Alam
*Assistant Examiner* — Tracy M McGhee
(74) *Attorney, Agent, or Firm* — William H. Hartwell

(57) ABSTRACT

ID management for a network attached storage system using layered ID mapping virtualization. When a connection request is received at a NAS server, it is determined whether the request is for a new user, and if so, user IDs are created for the new user. External user ID and filesystem user ID are mapped to the internal user ID, and user ID is verified at the NAS server kernel on subsequent logins with an external database. The user IDs are remapped for the changed user account, and updated mappings are transmitted from the NAS server to one or more NAS server kernel repositories.

20 Claims, 4 Drawing Sheets

(56) References Cited

U.S. PATENT DOCUMENTS

| | | | |
|---|---|---|---|
| 2009/0077201 A1* | 3/2009 | Nakamura | H04L 29/12584 709/219 |
| 2010/0122332 A1* | 5/2010 | Kamei | G06F 21/6236 726/6 |
| 2014/0019880 A1 | 1/2014 | Kucera et al. | |

* cited by examiner

ID MANAGEMENT FOR A NETWORK ATTACHED STORAGE SYSTEM

FIELD OF THE INVENTION

The present invention relates generally to the field of network attached storage, and more particularly to ID management for a network attached storage system using layered ID mapping virtualization.

BACKGROUND OF THE INVENTION

Traditional file servers consist of a general purpose computer or workstation running a networking operating system that can support controlled file sharing, such as Novell NetWare®, UNIX®, or Microsoft Windows®. However, those solutions are usually inferior to a dedicated file serving solution, especially when considering the wider feature-set, better scalability and superior usability, performance, and stability of the dedicated solution.

A network attached storage (NAS) device is a dedicated file server located in a local area network (LAN). Unlike a general purpose computer or workstation, network attached storage architecture consists of the bare-bones components necessary to support file transfers and scalable storage such as hard disk or tape drives. Any data that appears in the form of files, such as text documents, web content, images, remote system backups, etc., can be stored in a NAS device. NAS devices require no keyboard, monitor, or mouse and usually run on an embedded or minimized operating system rather than a full-featured operating system.

Communication with NAS devices generally occurs over network connections using Transmission Control Protocol and Internet Protocol (TCP/IP). Commonly used client/server application protocols compatible with NAS are Sun Network File System (NFS), Server Message Block (SMB), SMB2, SMB3, and Hypertext Transfer Protocol (HTTP).

NFS was developed originally for sharing files between UNIX systems across a network. Support for NFS later expanded to include non-UNIX systems. However, most NFS clients today are computers running UNIX-like operating systems.

Server Message Block (SMB) was developed by IBM® and Microsoft® to support file sharing in Disk Operating System (DOS). As the protocol became widely used in Microsoft Windows®, the name changed to Common Internet File system (CIFS). This same protocol appears today in UNIX systems as part of the Samba package. HTTP-enabled NAS devices allow clients to transfer files using web browser applications and give network administrators the ability to configure the device.

SUMMARY

Embodiments of the present invention disclose a method, computer program product, and system for layered user ID mapping virtualization. When a connection request is received at a NAS server, it is determined whether the request is for a new user, and if so, internal IDs are created for the new user. External user ID and filesystem user ID are mapped to the internal user ID, and user ID is verified at the NAS server kernel on subsequent logins with an external database. The user IDs are remapped for the changed user account, and updated mappings are transmitted from the NAS server to one or more NAS server kernel repositories.

DETAILED DESCRIPTION

Figure 1:
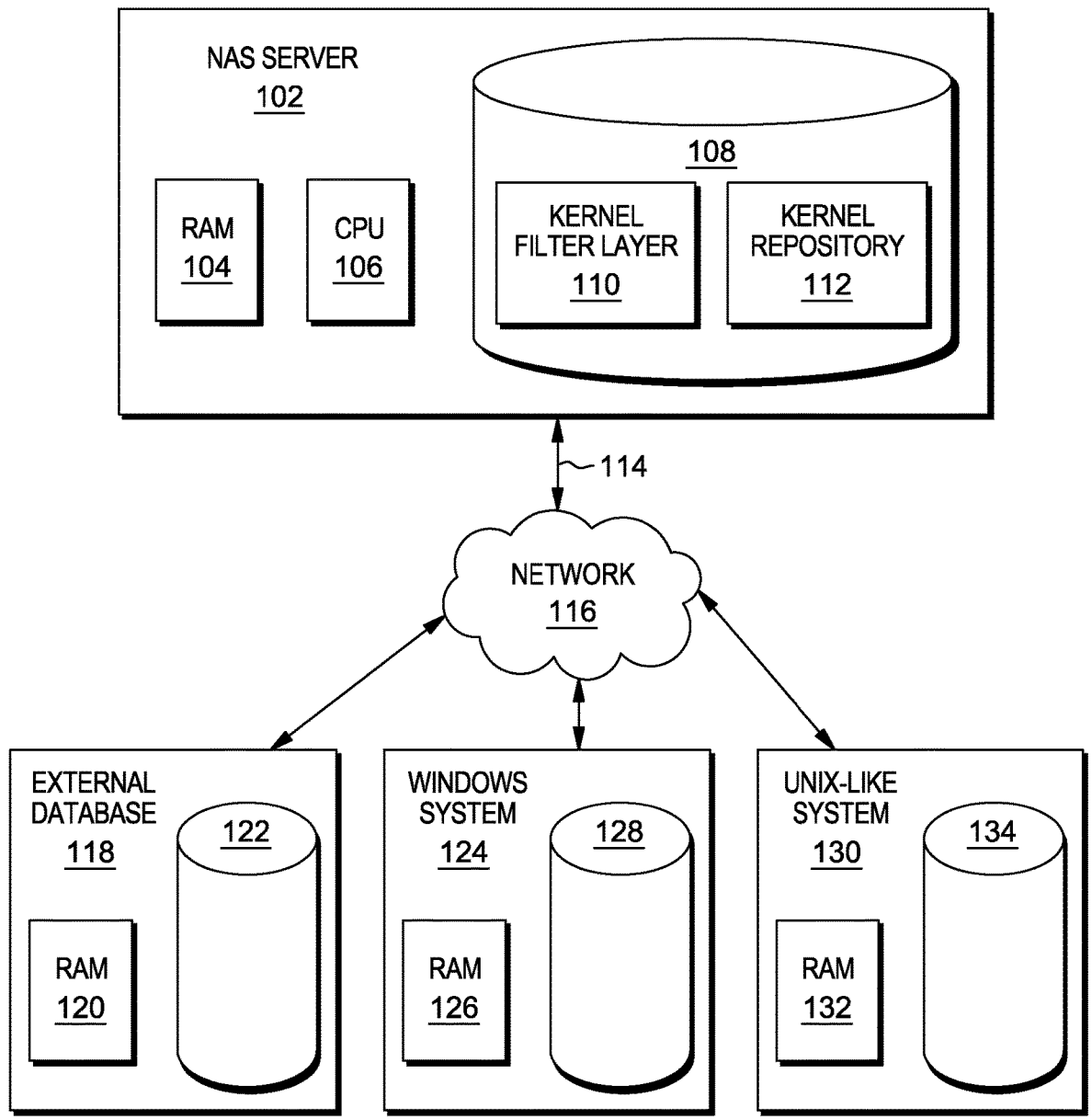
FIG. 1 is a functional block diagram illustrating a network attached storage environment, in an embodiment in accordance with the present invention.

A desired aspect of network attached storage (NAS) systems, both file-based and unified, serving multiple environments is to assign User Identifiers (UIDs) and Group Identifiers (GIDs) when required to Windows and Linux entities regardless of the account type. A centralized management system that virtualizes user IDs would allow users to have the same user ID regardless of the account type, such as Windows or UNIX, for example that is connecting to the system. A user would have the same UID/GID and retain ownership of their filesystem or multiple filesystems. Normally, a user connecting to a NAS server using a Windows account would have a separate UID/GID and filesystem, even when connecting with a UNIX account at the same time.

This ID mapping virtualization separates the external identity of the user from the internal UID, as well as separating the internal IDs from the filesystem IDs. When a new user connects to the system, the system allocates new IDs in new layers of the kernel. An internal UID/GID entry, whose scope is independent of the scope of IDs used internally, and a kernel filesystem identity UID/GID which is independent from the external or the internal identity, then maps them to the external ID. This new user is then updated to all NAS server kernels in the cluster. A cluster consists of a number of connected computers or servers that work together or individually. During connection initialization, the external ID is mapped to an internal ID which is used when permissions or ownership entries are written to the filesystem by that connection. These entries are mapped to the corresponding filesystem IDs during Input/Output (110) operations and the mappings are used when permission and ownership entries are read from the filesystem. Assigning of the internal UID/GID and filesystem IDs is managed using a centralized ID management system, and mirrored across all nodes on the NAS cluster.

Using two layers of virtualization eliminates the need for a complex mapping configuration, since the ID scopes used internally are separated from the ID scopes used externally. Therefore, if a user with UID X exists externally, this UID does not need to be reserved for it internally, since this user will be mapped to the next available UID. In addition, since both layers of mapping entries can change at any time, and more than one ID of one layer can be mapped to the same ID on a different layer, the system can adapt to many changes in the external environment in a non-disruptive manner.

A user ID (UID) is a unique positive integer assigned by an operating system to identify users. Users are identified to the systems by their UIDs rather than their user names. A group ID (GID), contained within a UID, is a unique positive integer used to indicate which groups the user belongs to. UID/GID numbers are how UNIX-based systems keep track of file and process ownership. Environments with more than one UNIX-based system can result in inconsistent UID/GID numbers across the servers.

When using a NAS server for servicing multiple environments, such as Windows and UNIX-based systems, administrators may wish to modify the identity mapping configuration of the system. In many cases, it may even be necessary to alter the default configuration to accommodate a new identity mapping configuration, and such system-level modifications may be difficult to undo. In some cases, integrating the NAS device may require changes in the external ID management environment, such as Active Directory, Lightweight Directory Access Protocol (LDAP), or Network Information System (NIS), which can be difficult to implement for some administrators. It is usually required to separate the scope used for mapping Windows users and groups from the one used for mapping UNIX accounts, as well as separating those from the IDs used internally by the NAS server.

In addition, changes done in the external identity of users and groups, as well as in the correlation between already existing entities from different environments, cannot be reflected automatically into the NAS server, since the identities are propagated into the security entries for file system objects. Changes to these entries would require traversing the entire file system and changing the access control list (ACL) ownership for each entry, which is impracticable for very large file systems. An ACL list is a list of access control entries (ACE) that identifies a trusted user and specifies the access right granted for that user. An example of this would be adding a UNIX account to an existing Windows account. This would require fixing all file system entries which match the ID of the Windows account to those which match the new UNIX account, or vice versa. In addition, such a change is non-revertible, so configuration errors cannot be undone.

A user or a group can have multiple different UID/GID numbers across several servers. For example user "steve" has UID 503 on server01, and UID 5502 on server02. The same UID/GID number can be used by multiple different users or groups across systems. For example, UID 503 is user "steve" on server01, but UID 503 may be user "bob" on server02.

Having inconsistent UID/GID numbers across servers can cause several problems, such as issues with file ownership on NFS exports and issues with file ownership when swinging SAN storage/file systems between servers. Using a central authentication system such as LDAP requires consistent UID/GID numbers.

Embodiments in accordance with the present invention will now be described in detail with reference to the Figures.

FIG. 1 is a functional block diagram illustrating a network attached storage (NAS) environment, in an embodiment in accordance with the present invention. A NAS server 102 includes RAM 104, a central processing unit 106, and persistent storage 108. Persistent storage 108 may, for example, be a hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage medium that is capable of storing program instructions or digital information. Kernel filter layer 110 that is stored in persistent storage 108 includes operating system software as well as software that enables the NAS server 102 to communicate with users, and update other NAS servers in the cluster over data connection 114. There can be many more storage devices in this environment than are depicted in FIG. 1. Persistent storage 108 also contains kernel repository 112, used to store the ID mapping for the external and internal IDs and is kept consistent across the cluster. There can be many more NAS servers in this environment than are depicted in FIG. 1. They may be operating as standalone servers, or clustered together mirroring data.

In FIG. 1, network 116 is shown as the interconnecting fabric between NAS server 102, external database 118, Windows system 124, and UNIX-like system 130. In practice, the connection may be any viable data transport network, such as, for example, a LAN or WAN. There can be many more endpoints, using several operating systems, than are depicted in FIG. 1.

External database 118 also contains RAM 120 and persistent storage 122, such as a hard disk drive. NAS server 102 verifies user accounts with external database 118 during the initialization of the connection. Changes to user accounts require that connections for those users be recreated to initialize the detection process. Windows system 124 also has RAM 126 and persistent storage 128, such as a hard disk drive. UNIX-like system 130 also has RAM 132 and persistent storage 134, such as a hard disk drive. Users connect to NAS server 102 over network 116 through data connection 114 to backup, archive, or restore data. There can be many more Windows systems 124 and UNIX-like systems 130 in the environment than depicted in FIG. 1.

Figure 2:
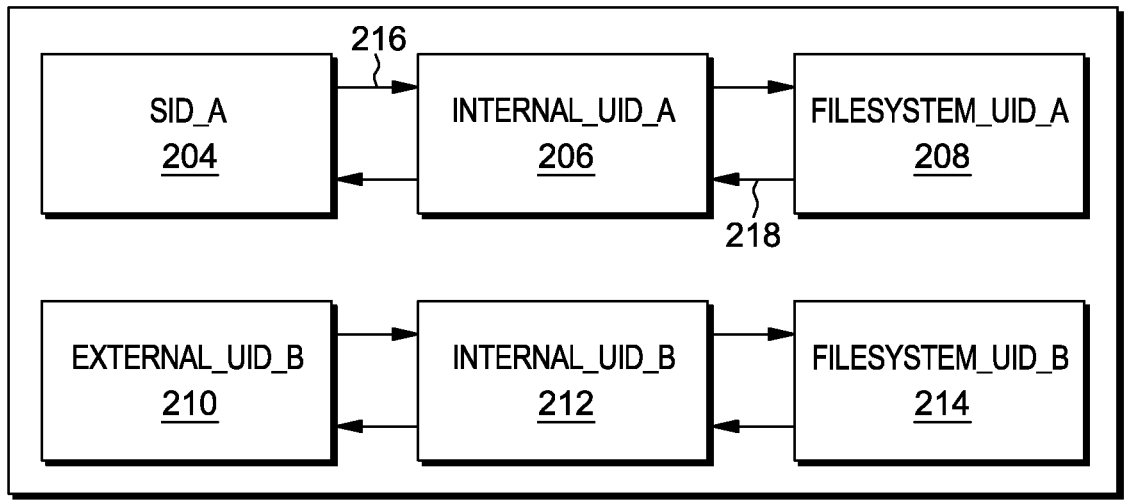
FIG. 2 is a functional block diagram illustrating the two layers of virtualization separating the external Windows user identity from the internal user identity and filesystem identities in addition to a NFS user connecting with an external user ID, in accordance with an embodiment of the present invention.

FIG. 2 is a functional block diagram illustrating the two layers of virtualization separating the external Windows user identity from the internal user identity and filesystem identities in addition to a NFS user connecting with an external user ID, in accordance with an embodiment of the present invention. A user connects to NAS server 102 using a Windows user account with system ID SID_A 204 for the first time. Kernel filter layer 110 allocates a new internal ID INTERNAL_UID_A 206 for the user and filesystem ID FILESYSTEM_UID_A 208 is assigned for the user. Kernel filter layer 110 then maps internal ID INTERNAL_UID_A 206 and filesystem ID FILESYSTEM_UID_A 208 to the user's external ID SID_A 204 as indicated by mapping indicators 216 and 218. A Network File System (NFS) account then connects to the NAS server 102 using an external ID EXTERNAL_UID_B 210. Kernel filter layer 110 allocates a new internal ID INTERNAL_UID_B 212 for the user and filesystem ID FILESYSTEM_UID_B 214 is assigned for the user. Kernel filter layer 110 then maps internal ID INTERNAL_UID_B 212 and filesystem ID FILESYSTEM_UID_B 214 to the user's external ID EXTERNAL_UID_B 210.

Figure 3:
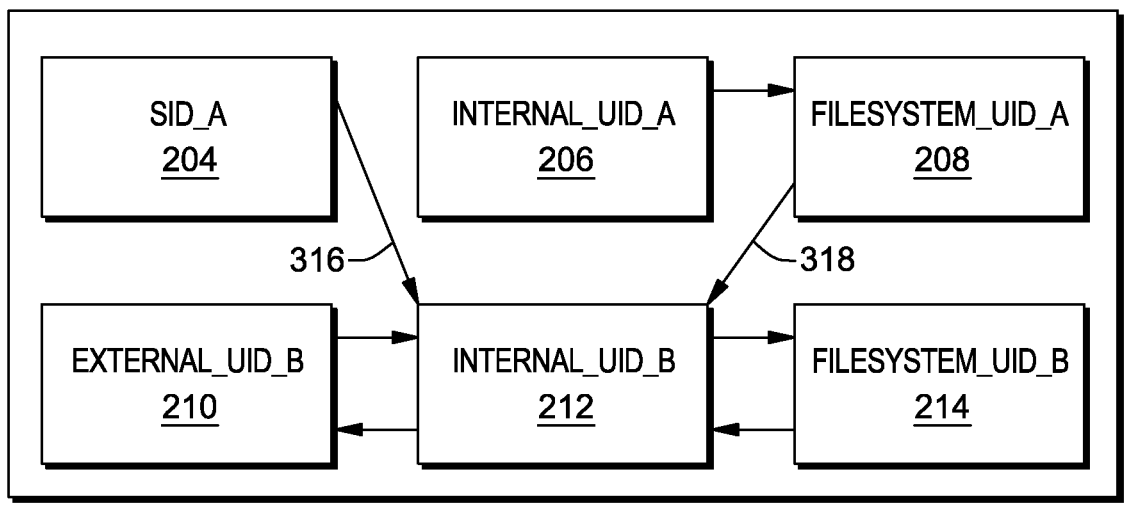
FIG. 3 is a functional block diagram illustrating the changed mapping once the Windows and NFS accounts are configured as one in an external database and the system detects the change on the next login, in accordance with an embodiment of the present invention.

FIG. 3 is a functional block diagram illustrating the changed mapping once the Windows and NFS accounts are configured as one in an external database and the system detects the change on the next login, in accordance with an embodiment of the present invention. The administrator modifies the external database such as Active Directory, Lightweight Directory Access Protocol (LDAP), or Network Information System (NIS) to indicate that Windows account using external ID SID_A 204 and NFS account using EXTERNAL_UID_B 210 are the same user.

Each action that relies on an ACL check, such as file open, ACL read, ACL write, goes through kernel filter layer 110 of the kernel, which maps the filesystem ID FILESYSTEM_UID_A 208 to the internal ID INTERNAL_UID_B 212 in real time using the kernel repository 112. External ID SID_A 204 is also mapped to the internal ID INTERNAL_UID_B 212 as indicated by mapping indicators 316 and 318. When a change in the mapping is detected, the change is propagated to all the kernels in the system. Once this is done, the relevant filesystem ID to internal ID translation will be different. However, the ACLs themselves do not change in any way. Therefore, the change can be done atomically and without doing any action on any of the files on the filesystem.

Figure 4:
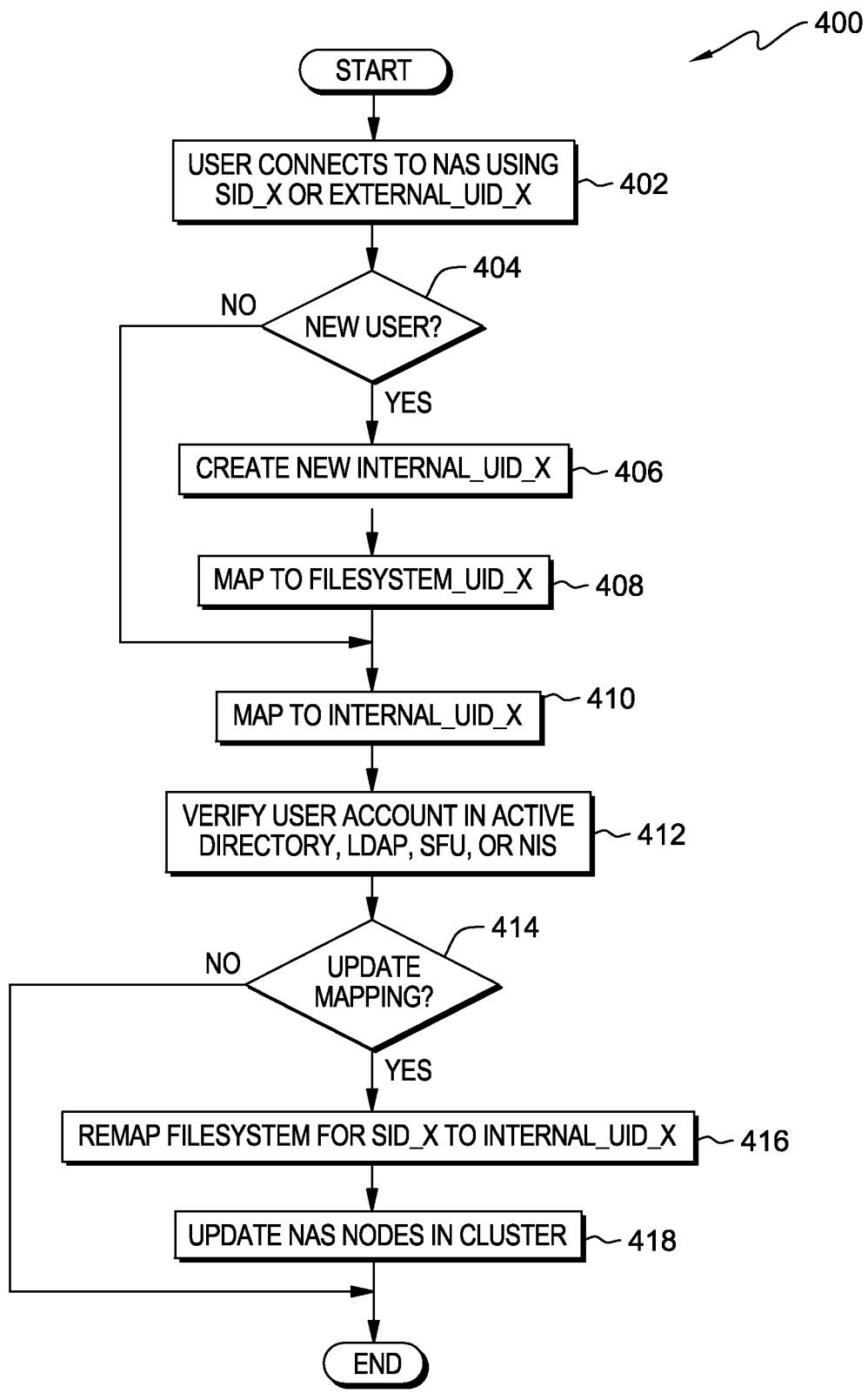
FIG. 4 is a flowchart depicting operational steps of the external user connecting to the NAS server, creating the internal user and filesystem identities, mapping the external UID and filesystem to the internal UID, and checking the external database for configuration changes to user account and remapping if required, in accordance with an embodiment of the present invention.

FIG. 4 is a flowchart, generally depicted by the numeral 400, illustrating operational steps of the external user connecting to the NAS server, creating the internal user and filesystem identities, mapping the external UID and filesystem ID to the internal UID, and checking the external database for configuration changes to user account and remapping if required, in accordance with an embodiment of the present invention. In step 402, a user connects to NAS server 102 over network 116 using Windows system 124 or UNIX-like system 130. NAS server 102 checks to see if this is a new user connection in step 404. If the connection is for a new user ("yes" branch, step 404), kernel filter layer 110 creates a new internal UID and maps a filesystem UID to it, as seen in steps 406 and 408 respectively, and stores them in kernel repository 112. In step 410, the external user is then mapped to the internal UID. If the connection is for an existing user rather than a new user ("no" branch, step 404), kernel filter layer 110 maps the external user ID to the internal UID as seen in step 410, bypassing steps 406 and 408.

In step 412, NAS server 102 verifies the user account in active directory over network connection 114 to network 116 on external database 118. If the account has changed, for example Windows user using external ID SID_A 204 is the same user for NFS user using EXTERNAL_UID_B 210, the mapping is checked in step 414. If the mapping needs to be updated ("yes" branch, step 414), kernel filter layer 110 remaps filesystem UID FILESYSTEM_UID_A 208 and the external ID SID_A 204 to INTERNAL_UID_B 212 as seen in step 416. The change is then propagated to all the NAS nodes in the cluster and written into kernel repository 112 as seen in step 418. If no change in the user account is detected ("no" branch, step 414), the connection process is continued with no changes made to mappings.

Figure 5:
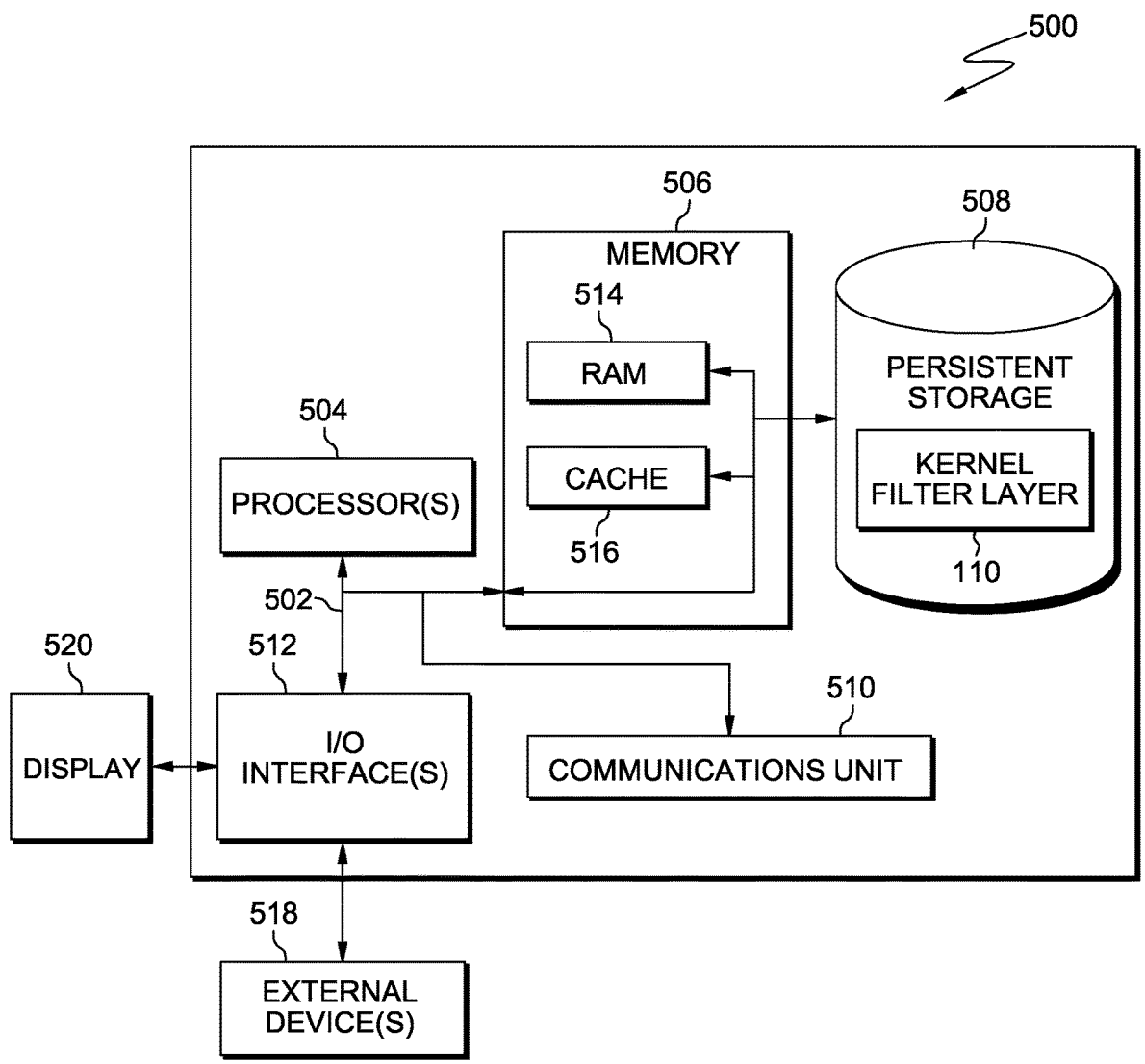
FIG. 5 depicts a block diagram of components of the server computer executing the identity mapping program on the NAS server, in accordance with an embodiment of the present invention.

FIG. 5 depicts a block diagram of components of a computer system 500 in an embodiment in accordance with the present invention. Computer system 500 is representative of NAS server 102 that hosts kernel filter layer 110, kernel repository 112, data structures, or other resources in an illustrative embodiment in accordance with the present invention. It should be appreciated that FIG. 5 provides only an illustration of one implementation and does not imply any limitations with regard to the environments in which different embodiments may be implemented. Many modifications to the depicted environment may be made.

Computer system 500 includes communications fabric 502, which provides communications between computer processor(s) 504, memory 506, persistent storage 508, communications unit 510, and input/output (110) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media.

Kernel filter layer 110 and kernel repository 112 (not shown) are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of network 116 and external systems 118, 124, and 130. In these examples, communications unit 510 includes one or more network interface cards. Communications unit 510 may provide communications through the use of either or both physical and wireless communications links. Kernel filter layer 110 and kernel repository 112 may be downloaded to persistent storage 508 through communications unit 510.

I/O interface(s) 512 allows for input and output of data with other devices that may be connected to computer system 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention, e.g., kernel filter layer 110 and kernel repository 112 may be stored on such portable computer readable storage media and may be loaded onto persistent storage 508 via I/O interface(s) 512. I/O interface(s) 512 may also connect to a display 520.

Display 520 provides an optional mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    receiving, by a first networked storage device, a first connection request from a user on a first host, wherein the first connection request identifies the user using a first external user identifier (ID) that exists for the user on the first host;
    creating, by the first networked storage device, a first filesystem user ID for the user to access a filesystem of the first networked storage device, wherein the creating includes writing the first filesystem user ID to local storage on the first networked storage device;
    mapping, by the first networked storage device, the first external user ID and the first filesystem user ID to a first internal user ID for the user, wherein the mapping includes writing the first external user ID and the first internal user ID to the local storage on the first networked storage device with the first filesystem user ID;
    in response to determining that a second external user ID exists for the user on a second host, wherein the second external user ID is mapped to a second internal user ID and a second filesystem user ID for accessing a filesystem of a second networked storage device, remapping, by the first networked storage device, the first internal user ID so that the first internal user ID is mapped to the second external user ID and the second filesystem user ID in addition to the first external user ID and the first filesystem user ID, wherein the remapping includes writing the second filesystem user ID and the second external user ID to the local storage on the first networked storage device with the first external user ID, the first filesystem user ID, and the first internal user ID; and
    propagating, by the first networked storage device, the remapped first internal user ID to local storage on the second networked storage device, wherein the propagating enables the user to access the second filesystem user ID on the second networked storage device using either the first host or the second host.

2. The method of claim 1, wherein the first host and the second host have different operating systems.

3. The method of claim 2, wherein the first host has a Windows operating system and the second host has a UNIX-like operating system.

4. The method of claim 1, wherein the first networked storage device and the second networked storage device are networked attached storage (NAS) servers, and wherein the local storage on the first networked storage device and the local storage on the second networked storage device include NAS kernel repositories.

5. A computer program product comprising:
    one or more computer readable storage media and program instructions stored on the one or more computer readable storage media, wherein the one or more computer readable storage media are not transitory signals per se, the program instructions comprising:
    program instructions to receive, at a first networked storage device, a first connection request from a user on a first host, wherein the first connection request identifies the user using a first external user identifier (ID) that exists for the user on the first host;
    program instructions to create, at the first networked storage device, a first filesystem user ID for the user to access a filesystem of the first networked storage device, wherein the creating includes writing the first filesystem user ID to local storage on the first networked storage device;
    program instructions to map, at the first networked storage device, the first external user ID and the first filesystem user ID to a first internal user ID for the user, wherein the mapping includes writing the first external user ID and the first internal user ID to the local storage on the first networked storage device with the first filesystem user ID;
    program instructions to, in response to determining that a second external user ID exists for the user on a second host, wherein the second external user ID is mapped to a second internal user ID and a second filesystem user ID for accessing a filesystem of a second networked storage device, remap, at the first networked storage device, the first internal user ID so that the first internal user ID is mapped to the second external user ID and the second filesystem user ID in addition to the first external user ID and the first filesystem user ID, wherein the remapping includes writing the second filesystem user ID and the second external user ID to the local storage on the first networked storage device with the first external user ID, the first filesystem user ID, and the first internal user ID; and
    program instructions to propagate, from the first networked storage device to local storage on the second networked storage device, the remapped first internal user ID, wherein the propagating enables the user to access the second filesystem user ID on the second networked storage device using either the first host or the second host.

6. The computer program product of claim 5, wherein the first host and the second host have different operating systems.

7. The computer program product of claim 6, wherein the first host has a Windows operating system and the second host has a UNIX-like operating system.

8. The computer program product of claim 5, wherein the first networked storage device and the second networked storage device are networked attached storage (NAS) servers, and wherein the local storage on the first networked storage device and the local storage on the second networked storage device include NAS kernel repositories.

9. A computer system comprising:
    one or more computer processors;
    one or more computer readable storage media, wherein the one or more computer readable storage media are not transitory signals per se;
    program instructions stored on the computer readable storage media for execution by at least one of the one or more processors, the program instructions comprising:
    program instructions to receive, at a first networked storage device, a first connection request from a user on a first host, wherein the first connection request identifies the user using a first external user identifier (ID) that exists for the user on the first host;
    program instructions to create, at the first networked storage device, a first filesystem user ID for the user to access a filesystem of the first networked storage device, wherein the creating includes writing the first filesystem user ID to local storage on the first networked storage device;
    program instructions to map, at the first networked storage device, the first external user ID and the first filesystem user ID to a first internal user ID for the user, wherein the mapping includes writing the first external user ID and the first internal user ID to the local storage on the first networked storage device with the first filesystem user ID;

program instructions to, in response to determining that a second external user ID exists for the user on a second host, wherein the second external user ID is mapped to a second internal user ID and a second filesystem user ID for accessing a filesystem of a second networked storage device, remap, at the first networked storage device, the first internal user ID so that the first internal user ID is mapped to the second external user ID and the second filesystem user ID in addition to the first external user ID and the first filesystem user ID, wherein the remapping includes writing the second filesystem user ID and the second external user ID to the local storage on the first networked storage device with the first external user ID, the first filesystem user ID, and the first internal user ID; and program instructions to propagate, from the first networked storage device to local storage on the second networked storage device, the remapped first internal user ID, wherein the propagating enables the user to access the second filesystem user ID on the second networked storage device using either the first host or the second host.

10. The computer system of claim 9, wherein the first host and the second host have different operating systems.

11. The computer system of claim 10, wherein the first host has a Windows operating system and the second host has a UNIX-like operating system.

12. The computer system of claim 9, wherein the first networked storage device and the second networked storage device are networked attached storage (NAS) servers, and wherein the local storage on the first networked storage device and the local storage on the second networked storage device include NAS kernel repositories.

13. The method of claim 1, wherein determining that the second external ID exists for the user on the second host is based, at least in part, on the first external user ID and the second external user ID corresponding to a single user ID entry in an external directory database.

14. The method of claim 4, wherein the NAS kernel repositories enable actions to be performed on files stored in the filesystems of the first networked storage device and the second networked storage device without modifying the respective access control lists (ACLs) of the files.

15. The method of claim 4, wherein the propagating further includes propagating the remapped first internal user ID to local storage on one or more other NAS servers.

16. The method of claim 15, wherein the first networked storage device, the second networked storage device, and the one or more other NAS servers each represent individual nodes in a NAS cluster.

17. The method of claim 16, wherein the nodes in the NAS cluster are mirrors of each other.

18. The method of claim 2, wherein the first host and the second host each have UNIX-like operating systems, and wherein the first external user ID and the second external user ID have inconsistent group IDs.

19. The method of claim 1, wherein the propagating removes the mapping between the second external user ID and the second internal user ID from the second networked storage device.

20. The method of claim 1, further comprising creating, by the first networked storage device, the first internal user ID.

* * * * *